N. P. FRANTZEN.
GRADER.
APPLICATION FILED APR. 12, 1915.
1,145,301.
Patented July 6, 1915.
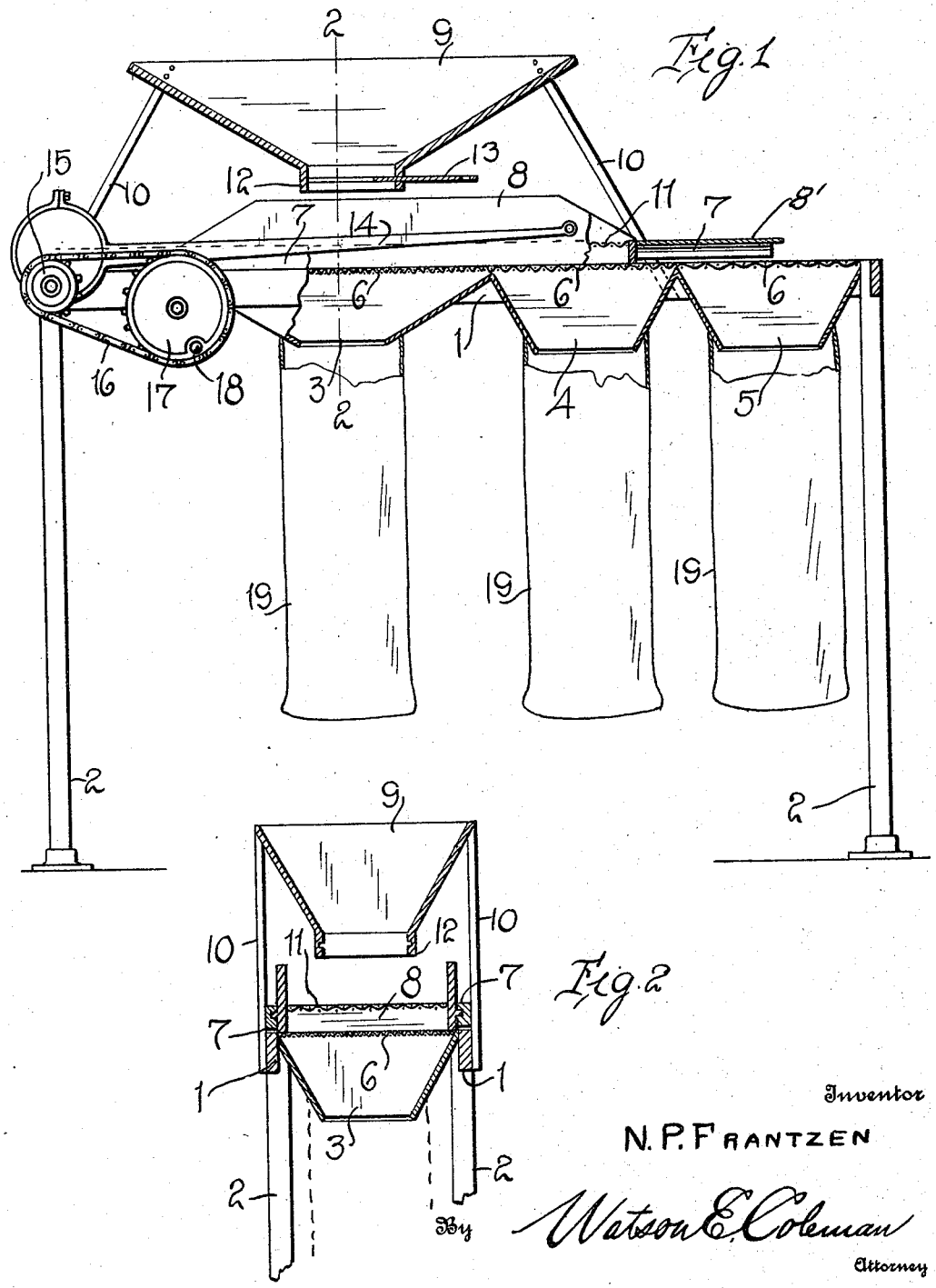
Inventor
N. P. FRANTZEN
By Watson E. Coleman
Attorney

UNITED STATES PATENT OFFICE.

NILS PEDER FRANTZEN, OF GOWRIE, IOWA.

GRADER.

1,145,301. Specification of Letters Patent. Patented July 6, 1915.

Application filed April 12, 1915. Serial No. 20,801.

*To all whom it may concern:*

Be it known that I, NILS P. FRANTZEN, a citizen of the United States, residing at Gowrie, in the county of Webster and State of Iowa, have invented certain new and useful Improvements in Graders, of which the following is a specification, reference being had to the accompanying drawings.

This invention comprehends certain new and useful improvements in separators or graders and relates particularly to a device designed for use in grading corn, although it is to be understood that the invention is not limited thereto.

The invention has for its primary object a durable and efficient construction of grading device embodying an elevated frame or stand provided with a plurality of discharge chutes or spouts to which sacks may be connected, a reciprocable grading device being movable upon the frame in the form of a box or casing disposed underneath a hopper held in an elevated position, the corn being dumped into the hopper and from thence to the reciprocating member which is moved back and forth over the spouts whereby the corn will be shaken down into the different sacks and thereby separated, according to the sizes of the grains. And the invention also aims to generally improve devices of this class so as to render them more useful and commercially desirable.

With the above and other objects in view, as will more fully appear as the description proceeds, the invention consists in certain constructions, arrangements and combinations of the parts that I shall hereinafter more fully describe and claim.

For a full understanding of the invention, reference is to be had to the following description and accompanying drawing, in which, Figure 1 is a longitudinal sectional view of a grading device embodying the improvements of my invention, Fig. 2 is a transverse sectional view thereof on the line 2—2 of Fig. 1.

Corresponding and like parts are referred to in the following description and designated in all of the views of the accompanying drawing by like reference characters.

Referring to the drawing, the numeral 1 designates a supporting frame which may be provided with legs 2 of any desired type whereby it may be held in the required elevated position to allow for a proper disposition of the sacks therein, said frame being provided with any desired number of discharge chutes or spouts, there being three of these in the present instance, designated 3, 4 and 5, respectively, the upper ends of these spouts being covered with screens 6, the meshes or openings of the screens varying in size, whereby one screen will pass one grade or size of corn and the other different sizes.

Upon the frame 1, parallel guide or track rails 7 are suitably mounted, said rails supporting the reciprocatory shaker 8. This shaker is in the form of a casing including side and end walls, and above the same a hopper 9 is arranged to discharge the seed into said shaker. This hopper is braced and supported by means of bars 10 which are rigidly fixed at their lower ends upon the frame structure. The reciprocatory shaker 8 is provided with a bottom consisting of a wire screen or sieve, indicated at 11. The hopper 9 is formed with a discharge spout 12 in which a sliding valve 13 is mounted, whereby the feed of the seed to the shaker may be controlled or completely cut off when desired. A horizontally disposed extension or platform 8' is provided upon one end of the shaker 8 for a purpose which will be later referred to.

In order to impart a reciprocatory movement to the grading element, the shaker 8 is pivotally connected at one side to one end of a pitman or connecting rod 14, said pitman being in turn connected to an eccentric disk and a sprocket wheel 15 around which a sprocket chain 16 is passed, said chain also passing around a hand-wheel 17 which is journaled at one side of the frame 1.

From the above description, taken in connection with the accompanying drawing, the operation of the device will be clearly understood. When the operator turns or rotates the wheel 17 by means of the handle 18, rotation is, of course, transmitted to the eccentric 15, and the latter, through the medium of the connecting rod 14, imparts a reciprocatory movement to the shaker upon the guide rails 7. The corn deposited in the shaker 8 from the hopper 9 is thus agitated and a portion thereof falls through the mesh of the screen or sieve 11 upon the screens 6 of the hoppers 3 and 4. The larger grains of corn are gradually directed upon the platform or extension 8′ and dropped therefrom upon the wide mesh screen 6 of the spout 5. The corn which falls through the sieve 11 of the shaker is graded into different sizes, the smaller size falling through the fine mesh screen of the spout 3 while the next size falls through the wide mesh of the sieve 6 for the spout 4. It will be understood that the grain is fed from the hopper 9 upon the reciprocating screen in sufficient quantity that the same collects in a pile immediately beneath the discharge spout of the hopper and the feed of the grain to the shaker screen is started when the screen is at the limit of its forward movement. Thus, in the rearward movement of the shaker screen, the grain will be agitated and the larger particles will roll forwardly upon the platform extension 8′. The end walls of the reciprocating screen, engaging the grain which falls upon the screens 6 of the spouts 3 and 4, shifts or agitates this grain over the screen surfaces so that in such movement, the particles of grain will be separated according to size, and passed through the respective screens 6. It will thus be understood that, in the reciprocating movement of the shaker 8, a natural separation of the grain into different sizes takes place owing to the difference in the specific gravity of the grain kernels and the rapid reciprocation of the shaker. Thus, the corn is graded into several sizes and finally deposited into the respective sacks or bags 19.

While the accompanying drawing illustrates what I believe to be the preferred embodiment of my invention, it is to be understood that the invention is not limited in this respect, but that various changes may be made in the details of construction, arrangements and proportions of the parts without departing from the scope of the invention as defined in the appended claims.

Having thus fully described my invention, what I desire to claim and secure by Letters Patent is:—

1. A grading device including spaced guide rails, a reciprocatory shaker slidably mounted upon said rails, a hopper supported upon the frame above said shaker, said shaker being provided with a wire screen fabric of uniform mesh throughout its area, discharge spouts mounted in the frame below said shaker, each of said spouts having a covering or screen, said screens being of relatively different mesh, a platform extending longitudinally from one end of the shaker, and means to reciprocate said shaker and agitate the grain falling through the screen of the shaker upon the screen of said spouts, the larger grains in the shaker being gradually directed therefrom in the agitation of the grain over said platform.

2. A grading device including spaced guide rails, a reciprocatory shaker mounted upon said rails, a hopper supported upon the frame above said shaker, discharge spouts mounted in the frame below said shaker, said spouts having grading screens of relatively different mesh, an additional discharge spout mounted in the frame having a grading screen of comparatively wide mesh, said shaker, in its reciprocatory movement, depositing the grains of different sizes upon the screens of the first named discharge spouts, a platform extension projecting longitudinally from one end of the shaker through which the relatively large particles of grain pass and are deposited upon the grading screen of said additional discharge spout, receiving receptacles attached to each of said spouts, and means for actuating said shaker.

In testimony whereof I hereunto affix my signature in the presence of two witnesses.

NILS PEDER FRANTZEN.

Witnesses:
ALBERT W. JOHNSON,
REUBEN JOHNSON.

Copies of this patent may be obtained for five cents each, by addressing the "Commissioner of Patents, Washington, D. C."